United States Patent [19]
Katyl et al.

[11] Patent Number: 5,838,116
[45] Date of Patent: Nov. 17, 1998

[54] FLUORESCENT LIGHT BALLAST WITH INFORMATION TRANSMISSION CIRCUITRY

[75] Inventors: Robert H. Katyl, Vestal; Robert M. Murcko, Binghamton; David W. Dranchak, Endwell, all of N.Y.

[73] Assignee: JRS Technology, Inc., Endicott, N.Y.

[21] Appl. No.: 632,297

[22] Filed: Apr. 15, 1996

[51] Int. Cl.$^6$ ...................................................... G05F 1/00
[52] U.S. Cl. .......................... 315/307; 315/291; 315/294; 315/312; 315/DIG. 4; 359/109; 359/113; 359/189
[58] Field of Search ..................................... 315/291, 294, 315/297, 307, 209 R, 312, 361, 362, 149, 194, DIG. 4; 359/109, 113, 142, 145, 147, 182, 183, 189; 364/492

[56] References Cited

U.S. PATENT DOCUMENTS

| | | | |
|---|---|---|---|
| 4,213,182 | 7/1980 | Eichelberger et al. | 315/312 X |
| 4,425,628 | 1/1984 | Bedard et al. | 364/900 |
| 4,856,090 | 8/1989 | Kitani et al. | 455/607 |
| 5,055,746 | 10/1991 | Hu et al. | 315/291 |
| 5,193,201 | 3/1993 | Tymes | 395/800 |
| 5,506,715 | 4/1996 | Zhu | 359/147 |

Primary Examiner—Robert J. Pascal
Assistant Examiner—Haissa Philogene
Attorney, Agent, or Firm—Salzman & Levy

[57] ABSTRACT

The present invention features an electronic fluorescent lighting ballast which provides a way to transmit data by modulating the light that is emitted from lamps in a luminaire. The modulation occurs at a sufficiently high frequency, so that it is imperceptible in the range of human vision. Data can be represented in the emitted light by frequency-, phase- or amplitude-modulation. Communication methods can be either simplex or duplex. In the preferred embodiment, a simple modification of the base circuit of a typical, Class D, bipolar, push-pull inverter permits frequency- or phase-modulation of the inverter waveform. This causes modulation of the emitted light from the lamps of the luminaire. The transmission of data through an otherwise conventional lighting luminaire is desirable for many commercial applications. One example of its usage is in the transmission of audio or digital information in a grocery or department store from a centralized computer to display units on store shelves. Another example of its usage is in the transmission of audio or digital information from a central computer to various fixed or portable display terminals in an airport, providing arrival and departure information.

30 Claims, 10 Drawing Sheets

FLUORESCENT LIGHT BALLAST WITH INFORMATION TRANSMISSION CIRCUITRY

FIELD OF THE INVENTION

The invention pertains to the transmission of information with modulated light and, more particularly, to modulating the light emitted from the lamps of a fluorescent luminaire for the purpose of transmitting data to surrounding display units.

BACKGROUND OF THE INVENTION

As in many industries today, the lighting industry emphasizes the reduction of energy consumption. Electronic ballast technology is one development in the industry which allows a reduction in energy usage through gas discharge- and fluorescent lighting. Electronic ballasts energize lamps with a current of a much higher frequency than do inductive ballasts (25 to 80 kHz, as compared to the conventional 50 to 60 Hz). Due to the gas discharge within a lamp, part of the light emitted thereby will vary periodically, at a rate that is twice the frequency of the applied lamp current. This inherent amplitude modulation of the emitted light is remotely detectable; it therefore can be used as a carrier for the transmission of voice or data messages.

The present invention pertains to an electronic ballast for gas discharge- or fluorescent lighting that includes modulation circuitry which allows data to be encoded in the light emitted from a luminaire's lamps. Such a ballast provides the ability to transmit information via the emitted light from a plurality of luminaires to receiving, terminal units located within the effective lighting area of the luminaires. The modulation occurs at a sufficiently high frequency so that it is imperceptible in the range of human vision. The transmission of information through an otherwise conventional lighting luminaire is desirable for many commercial applications. One example of such usage would be the transmission of voice messages or digital price information in a grocery or department store. The information from a centralized computer could be transmitted from a luminaire's lamps to display units on store shelves.

The use of a conventional fluorescent lighting system as a data transmission medium also has a cost advantage in eliminating the need to wire large numbers of receiving devices. This transmission of modulated light has another advantage, in that the receiving units are not constrained by hard-wire fixturing, allowing the receiving units to be portable or repositionable within the illuminated area. Another use of this data transmission system could be in airports. Information such as arrivals and departures can be transmitted from a central computer to various display monitors distributed about the terminal. For people moving through an airport terminal, small, portable receivers built into devices such as watches could provide timely access to arrival and departure information.

DISCUSSION OF THE RELATED ART

The transmission of data through a lighting system is discussed in U.S. Pat. No. 5,193,201 (entitled "System for Converting a Received Modulated Light into Both Power for the System and Image Data Displayed by the System", and issued to TYMES on Mar. 9, 1993). TYMES discusses a data-processing system in which a host computer is connected to a lighting system, and transmits modulated light to a plurality of small, data-processing devices. Photo diodes are used to provide power to the receiving devices, as well as the data signal itself. A conventional coil-and-core inductive ballast is used to energize the fluorescent lamp. A control system provides modulation at a low data rate, in the 60 to 120 Hz range. The present invention differs from the above-identified patent, in that it features a modulated, energy-efficient electronic ballast for lamps of a fluorescent luminaire.

In U.S. Pat. No. 4,856,090 (entitled "Light Communication Equipment", and issued to KITANI et al on Aug. 8, 1989), the linking of small, portable terminals with a host computer by means of light communication is disclosed. Modulated light is emitted by light-emitting diodes and detected by photodiodes that are located at the center of a diffusion hood fixed to the ceiling of a room. The present invention differs from the above-identified patent, in that, among other reasons, to provide the radiated illumination, the present invention uses a conventional lighting system instead of an arrangement of light emitting diodes in a specially designed diffusion hood.

In U.S. Pat. No. 5,424,859 (entitled "Transceiver for Wireless In-Building Communication System", and issued to UEHARA et al on Jun. 13, 1995), an RF (radio frequency), wireless system provides communication between computer terminals and a host computer. The transceiver used in this system is located in a tubular housing; it replaces a fluorescent tube in a luminaire. The tubular housing contains both electronic components and the radiating/receiving antennae. Power is obtained from the 60 Hz inductive ballast through the fluorescent lamp socket in the luminaire. Another embodiment employs light-emitting diodes and photo diodes in a luminaire, along with an RF system to provide the communication function.

The current invention differs from the above patent, in that this invention uses a conventional fluorescent lamp and an electronic ballast to provide a modulation capability, by which data can be transmitted upon the light emissions of the lamp, instead of a specially-modified lamp-like device, containing a radio transceiver unit.

SUMMARY OF THE INVENTION

This invention pertains to an electronic ballast for a conventional fluorescent- or gas-discharge lamp that contains modulation circuitry for the transmission of information upon the modulated light emissions of the lamp. Because of its high-frequency operation, with such a modified ballast, modulation at a higher transmission rate is possible. A 300-baud rate is easily obtainable through simple, inexpensive electronics built into the ballast. This 300-baud data rate is adequate for many text-based or simple, graphic-display applications. Applications such as store-price displays and airport arrival-and-departure displays can operate effectively at this rate. Modulation by audio signals can be handled in a similar manner.

Data communication arrangements are of two general types, simplex or duplex. The simpler type is simplex communication, which is a "talk-only" arrangement, whereby messages are only sent. This method does not provide a return data path from the receiver to the central computer. Simplex transmission is only useful for applications that display data. If a large number of displays are to be controlled, they can be individually addressable, with each receiving its own individualized data stream for its own processing and display. Duplex communication requires additional electronic hardware, so as to provide a return data path. In a duplex system, the terminal can both "talk" and "listen", i.e., send and receive data. An example of a system requiring duplex communication is a computer printer. Return data are, for example, a message indicating the status of the data buffer, and a monitory notice that the printer is out of paper. Return data may be sent via wireless communication channels (e.g., RF, infrared, visible optical radiation and ultrasound) or via hard-wired connections (e.g., fiberoptic, copper cable and telephone).

An object of this invention is to provide an energy-efficient electronic ballast, in which a modulation capability has been provided for the transmission of information (data and/or audio signals) from a lamp contained within a luminaire.

Another object of the invention is to provide a data-reception capability whereby data responses from data terminals that are optically linked to a luminaire containing the inventively modified ballast can be directed back to a host computer.

Still another object of this invention is to provide a method of connecting the circuit-modified electronic ballast of this invention to a host computer.

Yet another object of the invention is to provide a modulation means for an electronic ballast, in which the modulation varies by frequency, phase or amplitude of the principal waveform of the light emitted from a luminaire.

BRIEF DESCRIPTION OF THE DRAWINGS

A complete understanding of the present invention may be obtained by reference to the accompanying drawings, when considered in conjunction with the subsequent, detailed description, in which.

DESCRIPTION OF THE PREFERRED EMBODIMENTS

Generally speaking, the present invention features an electronic ballast for a fluorescent- or gas discharge-type lamp that is modified by a circuit which modulates the lamp's light emissions, so that data and information can be transmitted via the light emissions at relatively high frequencies.

Figure 1:
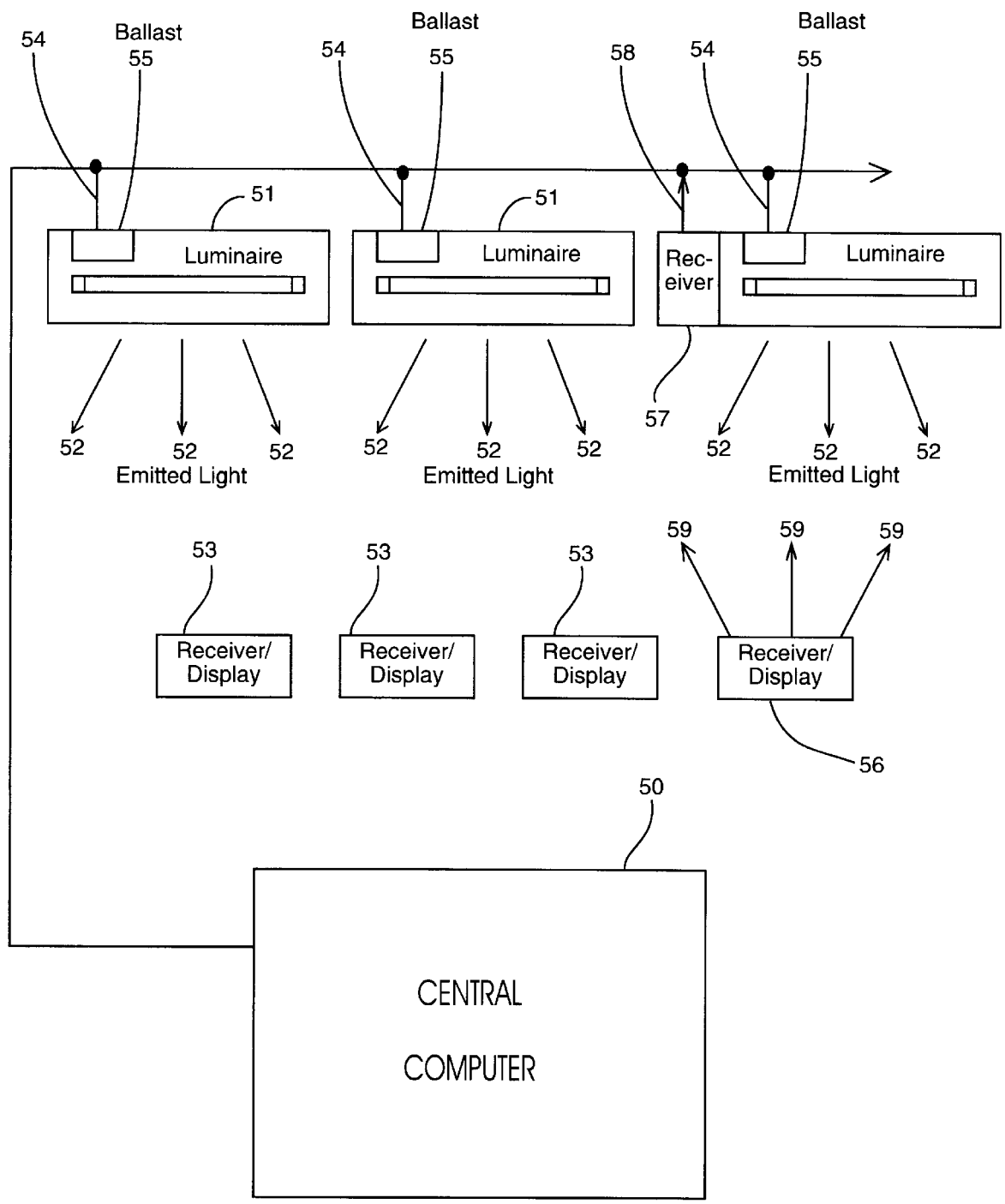
FIG. 1 shows a schematic view of a general layout of a communication arrangement that uses a data link provided by a modulated, fluorescent lighting system.

Now referring to FIG. 1, a general schematic layout of a communication arrangement 100, in accordance with the principles of this invention, is shown. The schematic layout 100 uses a data link provided by a modulated, fluorescent lighting system. Both simplex receiving devices 53 and duplex receiving devices 56 are illustrated. Data from a source, such as a central computer system 50, is connected to input data ports 54 located on the ballasts 55 of a plurality of fluorescent lighting luminaires 51. Emitted light (arrows 52) is modulated, as will be described hereinbelow. The light 52 impinges onto a plurality of receiving devices 53 and 56, respectively, for the display of information. Address data can be encoded into the emitted light stream 52, so that each of the respective receiving devices 53 can retrieve data messages directed thereto, ignoring the messages directed to the other receiving devices. Certain other receiving devices (such as device 56) also have the capability of sending replies or commands back to the host computer 50. These data streams can be sent over optical or RF media (arrows 59), or wiring. The return data is detected or received by sensing/receiving device 57, and transmitted back to the host computer 50 through output data port 58. There may be a plurality of devices 57 that are positioned throughout a large installation. Each may be located on a lighting luminaire, or even externally. The output data port of the ballast 58 connects the ballast to the host computer 50. The link employed can be one of several types, as discussed hereinafter.

If the type of modulation method utilized is frequency or phase modulation, the inclusion of data information into the light stream 52 will not be noticeable by human viewers, as the typical frequencies used by electronic ballasts are greater than 25 kHz, significantly exceeding the response of human vision. For both small degrees of modulation, and for frequencies above approximately 100 Hz, amplitude modulation is also imperceptible by human vision.

Possible embodiments are as follows:

1) modulation of the frequency of operation of a self-oscillating, push-pull, bipolar inverter through the variation of its average base current;

2) modulation of the frequency of operation of a self-oscillating voltage-controlled oscillator (VCO) or a timer circuit that is used to energize a power amplifier that energizes the fluorescent lamps; or 3) modulation of the amplitude of light intensity through the variation of power provided to the lamp drive circuitry from a regulated power supply.

Each of the above embodiments describes an alternative system for transmitting data from a light source. Arrangements to provide a return data path are required for duplex communication, which can easily be provided by using standard technology familiar to those skilled in the art. Each of these three embodiments can also easily be adapted to phase modulation by means well known in the communications field.

Figure 2:
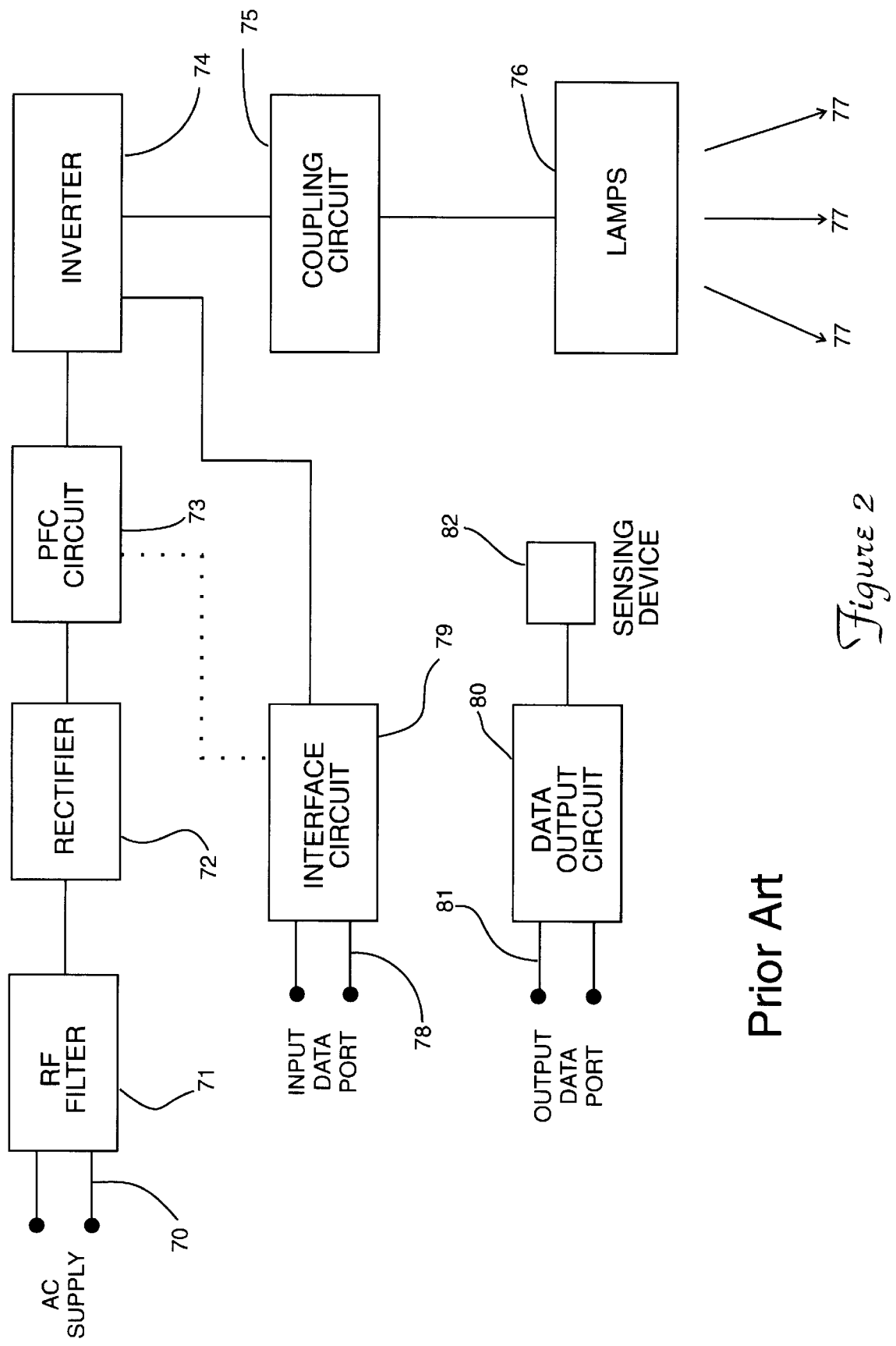
FIG. 2 depicts a block diagram of a typical electronic ballast.

Referring to FIG. 2, a block diagram 200 of a typical electronic ballast is shown. In the ballast, electrical power progresses from the AC supply 70 to the lamps 76. The ballast converts the incoming AC voltage to the levels that are needed to start and operate the lamps. It also provides a stabilizing, or, ballasting, action on the current provided to the lamps. Gas discharge lamps have a negative resistance property and are unstable, unless driven through ballasting circuitry.

Current from the AC supply is passed through an RF-suppressing filter 71 and into a rectifier circuit 72. In some ballasts, a power-factor correction (PFC) circuit 73 is used to provide an internal DC voltage. This circuitry causes the ballast to appear on the AC line as a pure resistive load, so that the current drawn by the ballast is in phase with, and in proportion to, the AC line voltage. Inverter circuit 74 inverts the DC supply voltage back to a high-frequency AC signal, typically in the range of 25 to 75 kHz. Operated in this frequency range, gas discharge lamps become more efficient, providing more light output for the same input power. Output coupling circuitry 75 links the lamps 76 to the inverter 74. Inverter circuit 74 can be either a self-oscillating power oscillator, a power amplifier driven by a low-voltage VCO or a timing circuit.

In the preferred embodiment, frequency or phase modulation can be obtained by simply varying the base current of the NPN, switching transistors of the inverter over a suitable range. This modulation slightly varies the time required to switch the transistor from an "on" state to its "off" state. This change in switching time causes a change in the frequency of inverter operation. The circuit itself requires few additional parts beyond those required by a standard electronic ballast. It should be noted that this modulation of the switching time is a result of the phenomenon of base charge storage, which is a basic property of bipolar transistors. This property is directly related to the bipolar device usage of the minority carrier transport of charge, and the resulting lag time for the dissipation of the minority carriers, when a device is switched off. This phenomenon is not present in MOSFET transistors which utilize majority carrier transport.

The principal bipolar inverter circuits with added modulation capability are shown hereinafter with reference to FIG. 3 and FIGS. 5 through 8.

Referring again to FIG. 2, the ballast 200 has an input data port 78. The input data port 78 allows the entrance of data for encoding into the data stream in the emitted light (arrows 77). The data signal received from data port 78 is isolated from the rest of the ballast circuitry 200 by interface circuitry 79. Interface circuitry 79 also converts the incoming data signal into the voltage and current levels that are required by the inverter circuitry 74. Also, ballasts can have the additional ability to receive data replies from duplex-type receiving devices. This data is sensed by data sensing device 82. Data sensing device 82 contains circuitry to establish the necessary voltages and/or currents, as well as the data structure required for communication with the host computer 50. This output data is sent to the host computer 50 through output data port 81, by any of a variety of communication media.

Connecting the circuit-modified, electronic ballast of this invention to a host computer 50 (shown in FIG. 1) can be achieved in several ways, including low-voltage data wiring, using coaxial cable or twisted-pair wiring. Other connection means can include modems that connect the host computer 50 to the AC building wiring, and ballast-placed modems connected to the power-input wiring. Still further connection means can include optical means for linking the ballast to an optical source/receiving device that is connected to the host computer 50. These optical means can include glass or plastic fibers, as well as fiber-less optical technology that is based on lenses sending optical data over free space. Another connection means can include the transmission of data to and from the ballast by RF, wireless communication devices.

Figure 3:
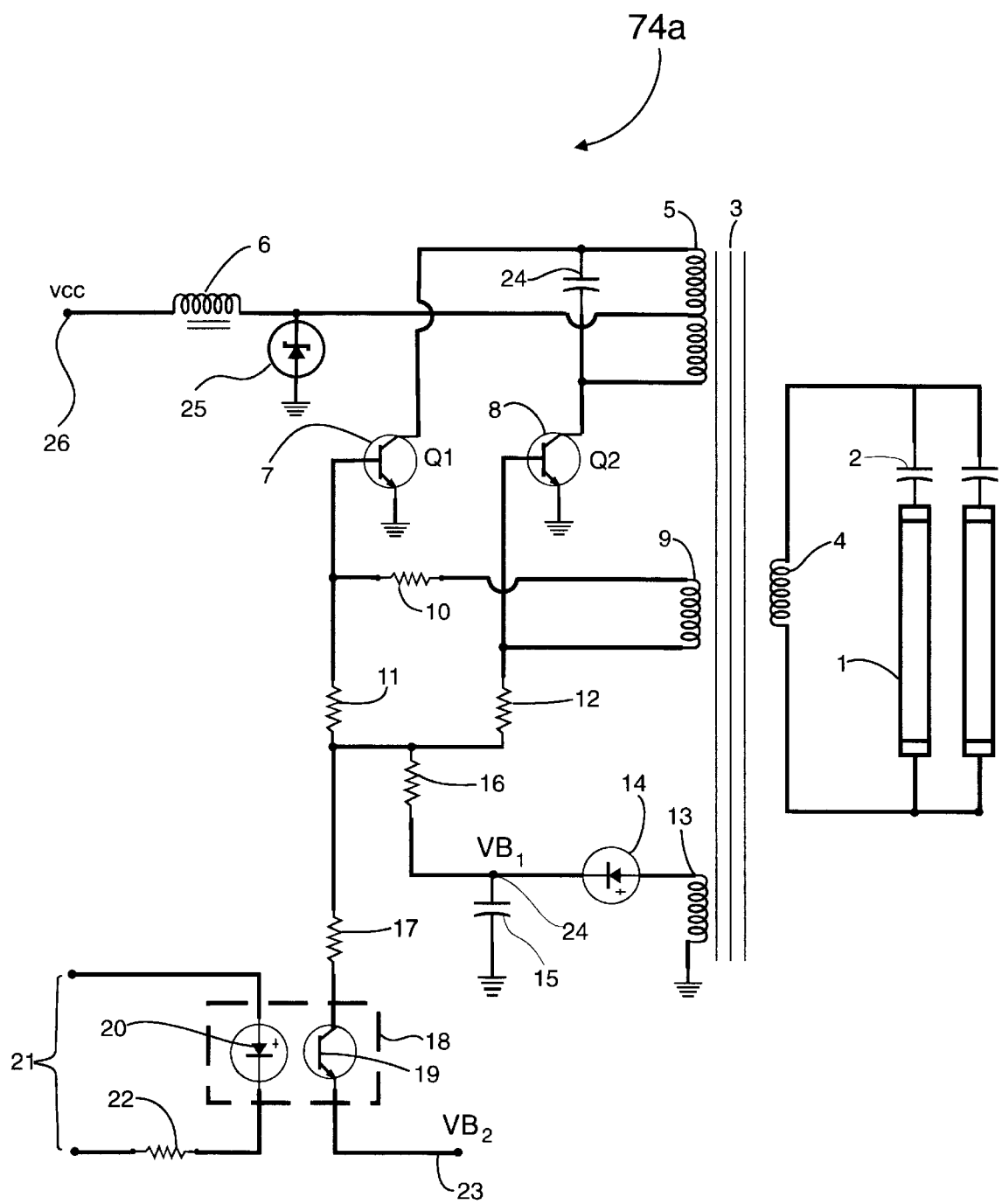
FIG. 3 illustrates a circuit diagram of a current-fed, parallel-resonant, push-pull ballast inverter with isolated output.

Referring to FIG. 3, a current-fed, parallel-resonant, push-pull ballast inverter 74a with isolated output is illustrated. The remaining circuits illustrated in FIGS. 5 through 8 can be modulated by using the same principles as described for FIG. 3. The methods used for modulation will be readily apparent to those skilled in the art.

In FIG. 3, the fluorescent lamps 1 are powered by a self-oscillating, push-pull, Class D bipolar inverter 74a. This inverter operates at a frequency above the audible range (in the 25 to 75 kHz range), and the emitted light is inherently modulated at twice the frequency of operation (since the intensity of emitted light follows the absolute value of the AC current waveform).

The lamps 1 are connected in a parallel fashion, in which each lamp and its corresponding, series-connected ballast capacitor 2 are placed in parallel across the secondary 4 of output transformer 3. The combined capacitance in the secondary circuit and the primary capacitor 24 in conjunction with the transformer inductance largely determine the oscillation frequency. An alternate coupling method, commonly used in electronic ballasts, uses lamps connected in series. This series connection does not affect the operation of the circuit as described here.

The switching time of the respective switch transistors Q1 and Q2 also affects the oscillation frequency. It is through modification of this switching time that the desired modulation of this invention is accomplished. Power is fed into the circuit from DC supply Vcc 26 through isolation choke 6, which acts as a constant current source. Transient-suppressing diode 25 eliminates any voltage spiking from choke 6 (which sometime arises when the circuit is turned on). The main base current into transistors Q1 and Q2 is supplied by a standard, half-wave rectifier circuit, comprising components 13, 14 and 15, respectively. Winding 9 on transformer 3 provides an AC feedback signal that controls transistor switching, so that positive feedback is obtained. This results in sustained oscillation. Resistor 10 limits the current during transistor switching; respective resistors 11 and 12 provide the base current to each transistor, while providing an isolating resistance.

One way of modulating the base current is to add current from an auxiliary source of voltage, e.g., the chip supply that is used by the PFC (power-factor correction) circuit 73 (shown in FIG. 2). Adding current from an auxiliary source of voltage can also be accomplished by modulating the current limiting resistor 16 via either a shunting resistance placed across it or a resistance placed in series therewith. The embodiment described here uses the first method, adding current from an auxiliary source of voltage. The photo-transistor 19 in opto-isolator 18 provides a link to the auxiliary supply 23 at VB2 via resistor 17. The base current increases to the switch transistors Q1 and Q2 when said photo-transistor 19 is in the "on", or, conducting, state. This increase in base current is controlled by current from an external data source, which enters the ballast through the input data port 21. Voltage across port 21 causes a current to flow through light-emitting diode 20 in opto-isolator 18. Resistor 22 determines the amount of current flow. The purpose of the opto-isolator 18 is to separate the ground reference used by the data source that is connected to data port 21 from the ground reference used by the internal circuitry of the ballast. Electrical separation of the ground references is very important, in order to prevent short-circuiting caused by improperly connected grounds, as ballasts are usually directly connected across the AC power bus without any isolation circuitry. Also, the isolation afforded by opto-isolator 18 eliminates any coupling of extraneous noise signals. As is well known in the art, this function can also be accomplished by utilizing a small signal transformer in place of opto-isolator 18. Binary or analog signal data applied to data port 21 progresses through the opto-isolator 18, causing a modulation of the base current into switching transistors Q1 and Q2.

Figure 4:
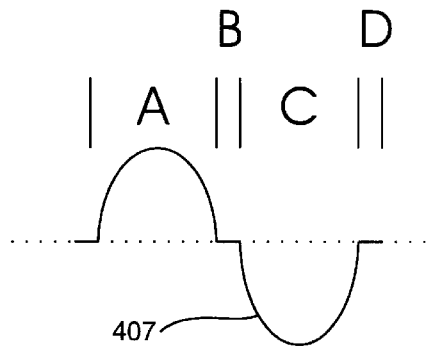
FIG. 4 shows a circuit diagram of the four stages of switching (A, B, C and D) of the push-pull ballast inverter depicted in FIG. 3.
Figure 4:
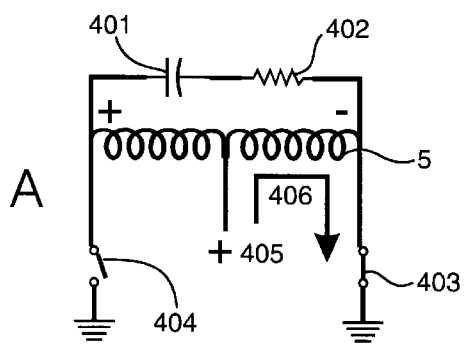
Figure 4:
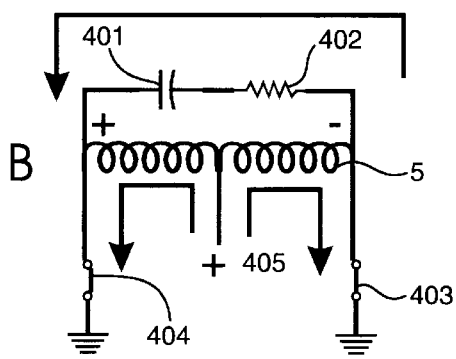
Figure 4:
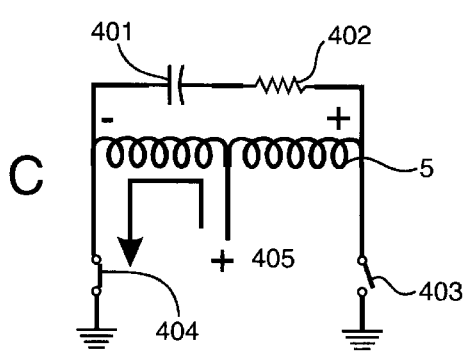
Figure 4:
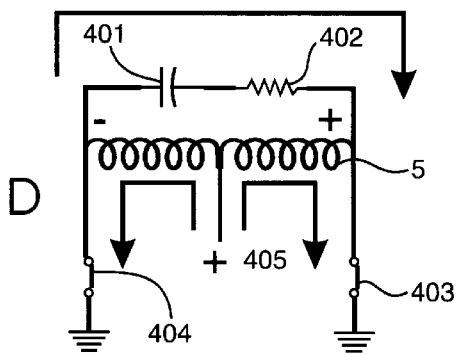
Figure 5:
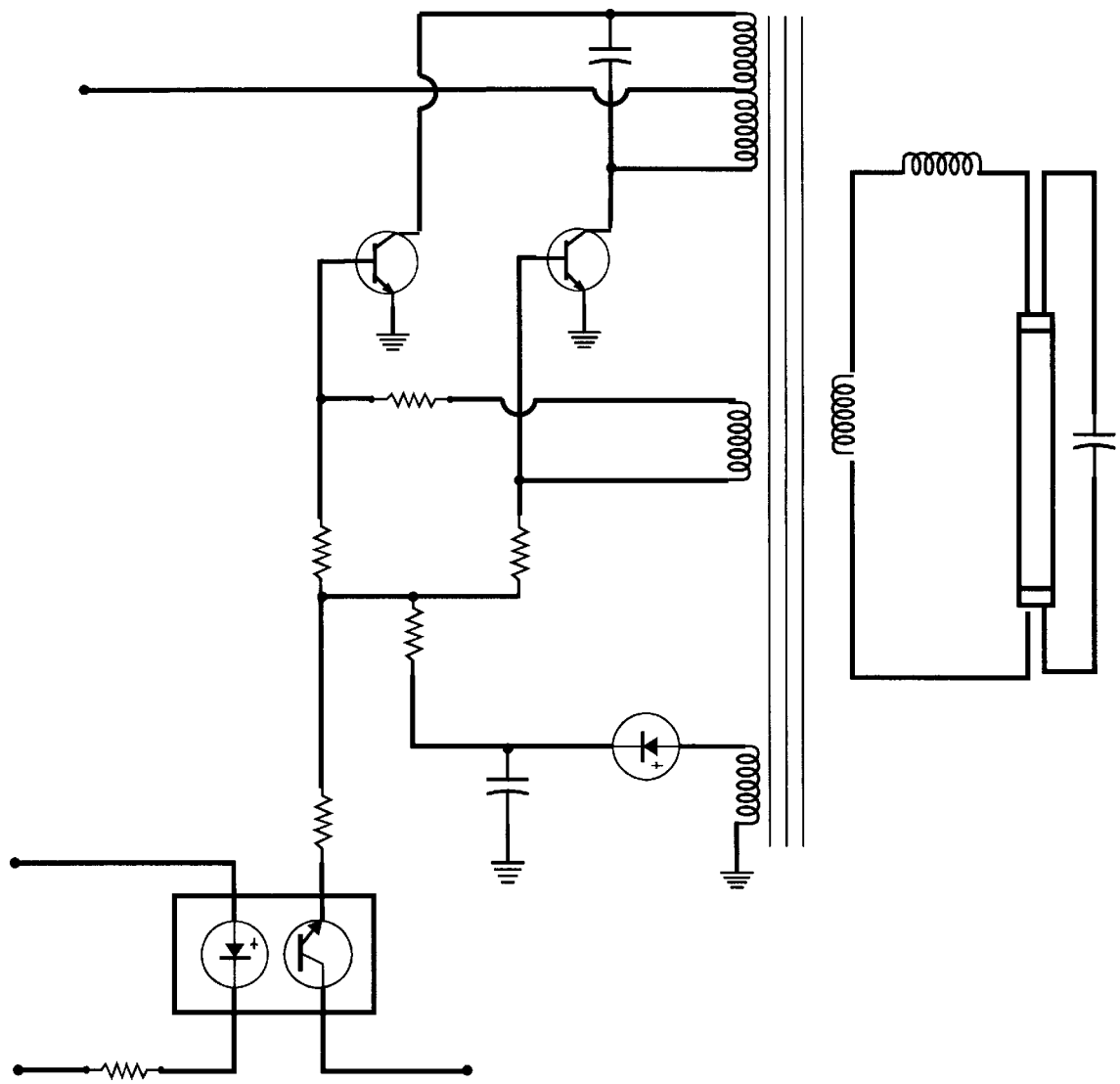
FIG. 5 shows a circuit diagram of a voltage-fed, parallel-resonant, push-pull ballast inverter with isolated output.

Referring to FIG. 4, the four stages of switching (A, B, C and D) of the push-pull inverter 74a of FIG. 3 are shown.. Waveform 407 depicts the secondary voltage from the output transformer; the stages of switching are shown as time intervals thereon. In this FIGURE, only a circuit fragment of the inverter 74a is shown for descriptive purposes. Transistors Q1 and Q2 of FIG. 3 are shown as open or closed switches 403 and 404. The secondary load is shown as an equivalent series RC circuit 401 and 402, representing the secondary load impedance reflected across the transformer onto the main, center-tapped winding 405. For most of the oscillation cycle, switches 403 and 404 alternate, with one switch on and the other off (represented by intervals A and C). However, for two brief intervals (B and D), both switches are on. These are the cross-conduction intervals, and are approximately equal to the time, $T_{store}$, that it takes for the stored charge to be removed from the transistor switch that had been conducting. The time, $T_{store}$, is typically on the order of a few microseconds, while the total period of oscillation is usually 15 to 40 microseconds. During the cross-conduction intervals, the current through the transformer winding reverses in direction. Brief pulses of short-circuit current flow from the supply, but are limited in extent through the shortness of the interval, as well as the inertial effect of the isolation choke 6 (shown in FIG. 3).

It is well known in the art that the amount of stored charge is affected by the extent of the conducting base current in the transistor switch. For example, published characteristics of switch transistors commonly plot the effect of base current on stored charge. A specific example is the published data on Philips Semiconductors transistor, part no. BU2508A, found on pages 144–149, of data book SC06, High-voltage and Switching NPN Power Transistors (Philips Semiconductors, P.0. Box 10330, Riviera Beach, Fla. 33404, July, 1994). FIG. 12 on page 147 of this reference shows a monotonic increase of storage time with increasing base current.

Thus, small changes in base current will cause a small change in the period of oscillation by modulating the delay caused by the cross-conduction intervals, B and D. This results in the desired frequency or phase modulation of the oscillation frequency. For example, for an inverter operating at 30 kHz, the oscillation period is 33.33 microseconds. A typical switch transistor may be operating with a storage time of 2 microseconds (total cross-conduction time of 4 microseconds). If the base current is changed so that the storage time decreases to 1 microsecond (cross-conduction time of 2 microseconds), then the period of oscillation shortens by 2 microseconds to 31.33 microseconds. This corresponds to an oscillation frequency of 31.92 kHz, an increase in frequency of 1920 Hz, and percentage of 6.4%. This is a significant increase in frequency; such a percentage is detectable with relatively simple circuitry. With this approximate frequency change, for example, the transmission of digital data at rates of 300 bits per second is feasible with simple circuitry.

In phase modulation, the base current modulation is applied as a short pulse of sufficient duration, so that a net phase change of 90 degrees takes place over a number of oscillation periods. Using the same numbers as in the above example, a 90-degree phase change corresponds to a delay of ¼ period, or 8.33 microseconds. With a decrease in cross-conduction time of 2 microseconds per oscillation period, the 90-degree phase shift can be accomplished in approximately 4 oscillation periods. The circuitry within the receiving device follows well-known principles, which should be obvious to those skilled in the art.

The modulation applied to the data port can be digital and encoded, so that one voltage level corresponds to a 0 bit, and another level corresponds to a 1 bit. It is also possible to encode the data onto a carrier signal which is applied to the data port. The carrier is a low-frequency signal in the audio range that is used to frequency-modulate the inverter. The carrier can be frequency- or phase-modulated, with this information sent over the frequency-modulated light emission. One obvious source of the carrier signal is a standard modem, a device used to send digital data over telephone lines. The modem has the advantage of being an inexpensive, highly-developed device that is designed to encode and decode the data with a low error rate. Many computer systems are equipped with such modems, and adapting them for the inventive purpose should be easily achievable.

Figure 6:
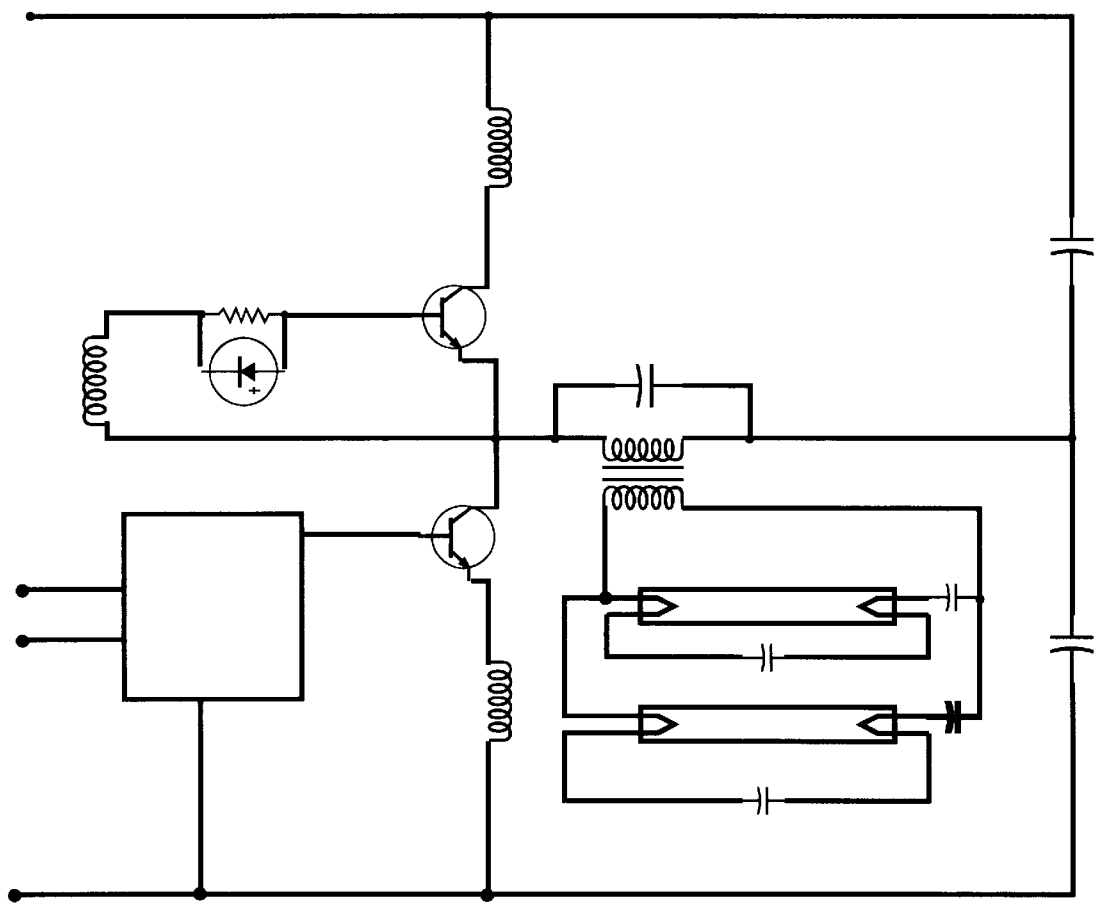
FIG. 6 illustrates a circuit diagram of a current-fed, parallel-resonant, half-bridge ballast inverter with isolated output.
Figure 6:
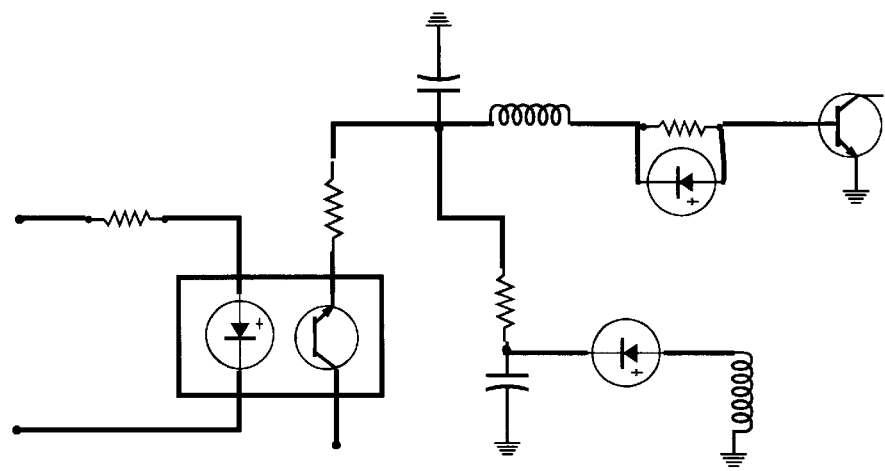
Figure 7:
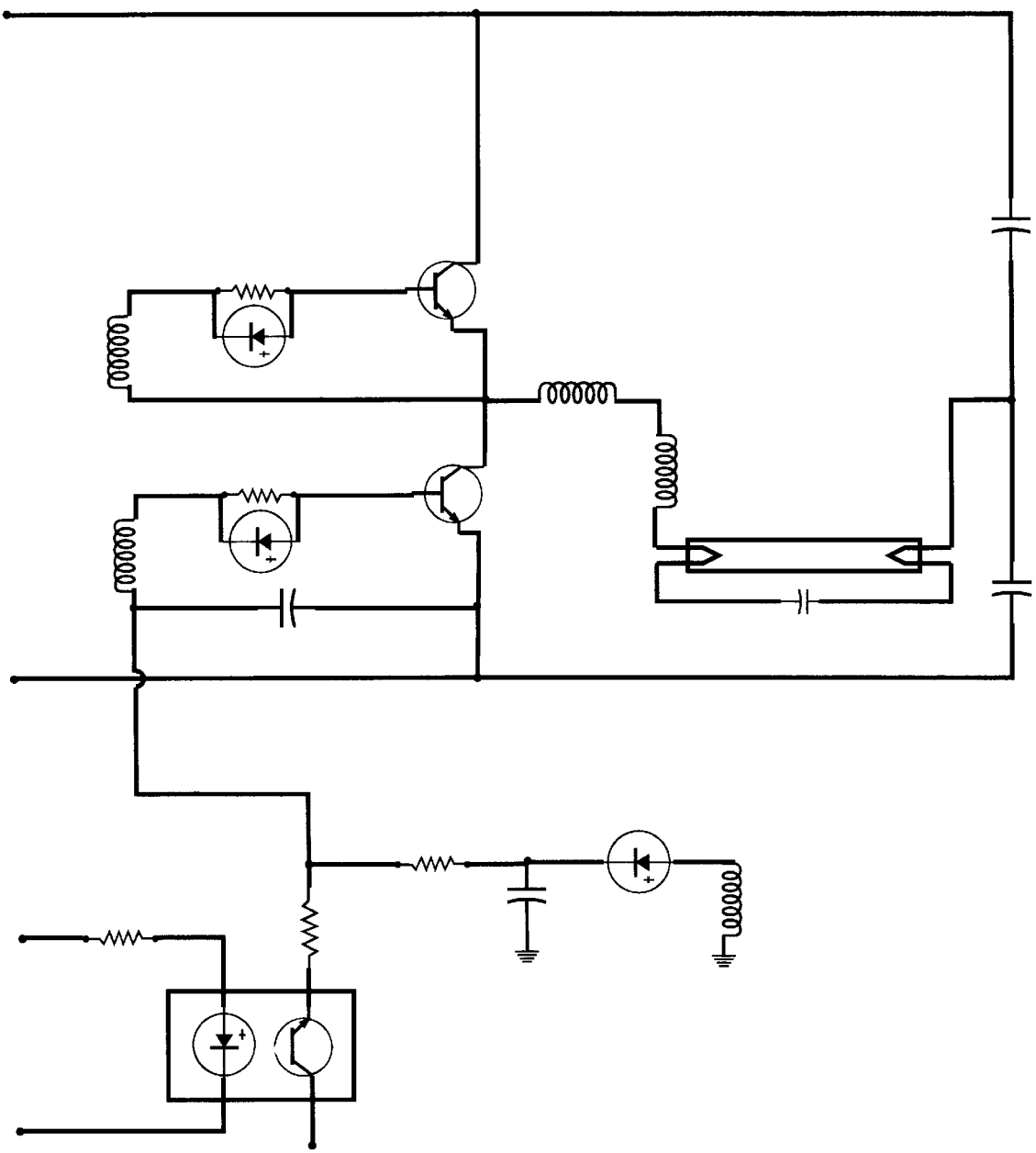
FIG. 7 shows a circuit diagram of a voltage-fed, half-bridge ballast inverter.
Figure 8:
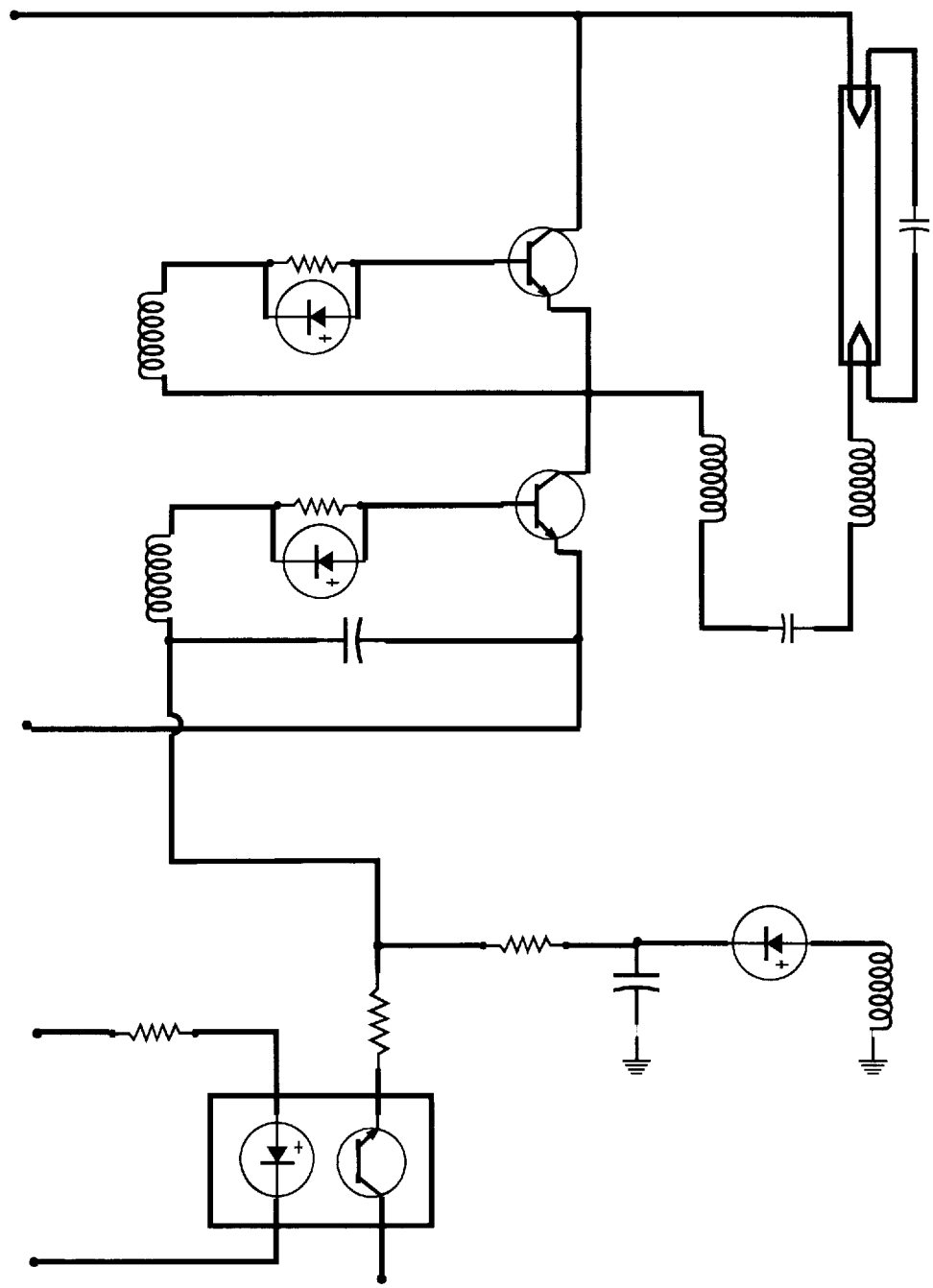
FIG. 8 depicts a diagram of an alternate embodiment of the circuit shown in FIG. 7.

The other respective inverter circuits 74b, 74c, 74d and 74e are shown in FIGS. 5 through 8. The action of the bipolar transistor during switching is the same as that described for the inverter circuit 74a (illustrated in FIG. 3). The same method of base current modulation can be used for these inverters. However, for the half-bridge circuits (FIGS. 6–8), the ground reference for the base drives are different. To modulate the switching time of both transistors in these circuits, two opto-coupler circuits with individual bias supplies are needed. For simplicity, only one modulation circuit is shown in FIGS. 6, 7 and 8. This type of approach produces only half the degree of frequency or phase modulation of that produced by the push-pull circuits.

Figure 9:
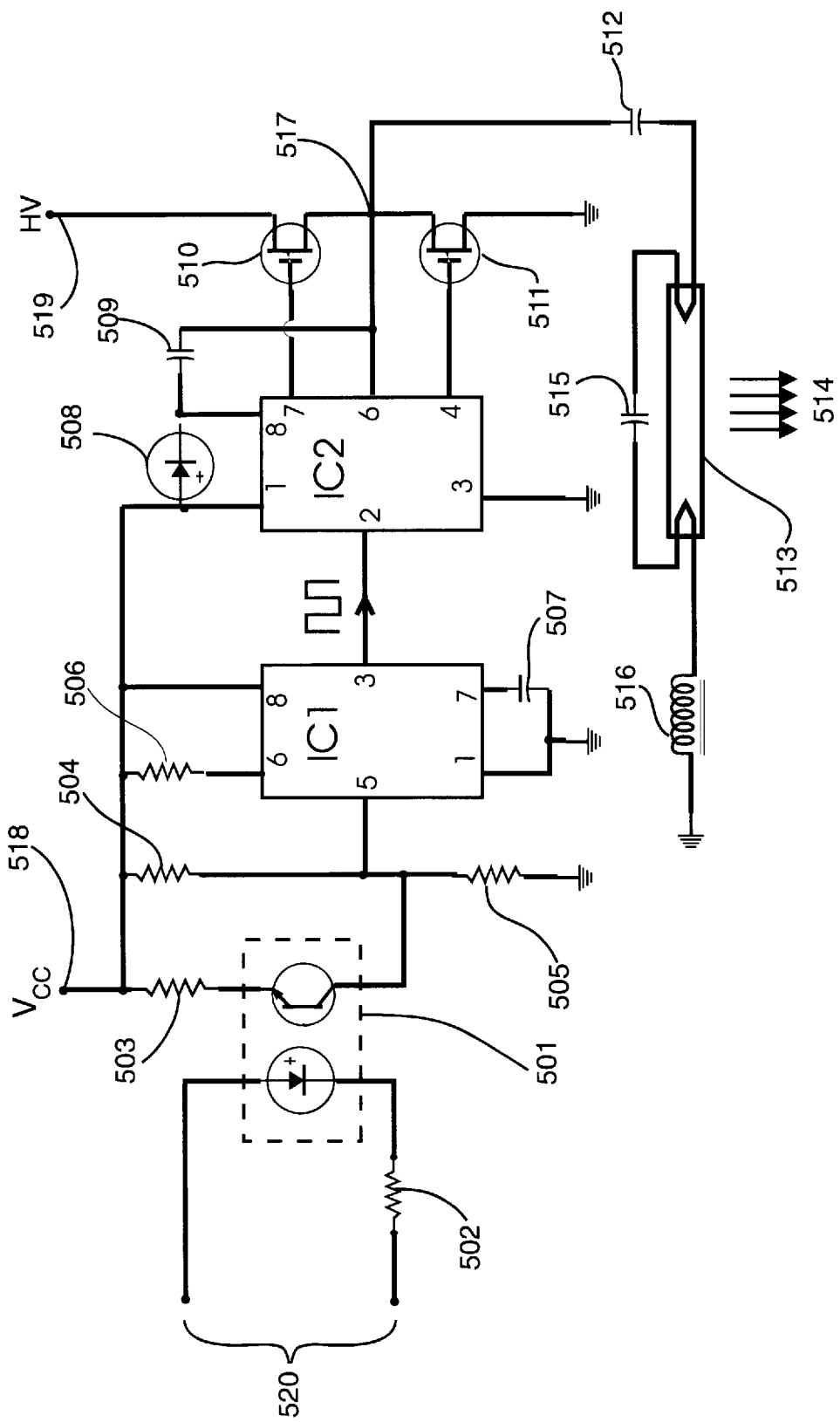
FIG. 9 illustrates a circuit diagram of an embodiment of the modified ballast of this invention, using a modulated, voltage-controlled oscillator (VCO) circuit.

Referring to FIG. 9, an embodiment is shown that uses a modulated VCO circuit. In this embodiment, an integrated circuit IC1 is used to form an oscillator, having a period that can be controlled by a signal voltage. This type of circuit is known as a VCO, or, voltage-controlled oscillator. Component IC1 is an industry standard, model no. 566 VCO integrated circuit, manufactured by National Semiconductor, for example. IC2 is a half-bridge MOSFET gate-driver integrated circuit, model no. IR2111, manufactured by International Rectifier Corporation. A square-voltage waveform is produced at node 517 by the alternate switching of the two MOSFETs, 510 and 511. This waveform couples into the standard fluorescent lamp circuitry via respective components 512, 513, 515 and 516 in order to energize fluorescent lamp 513 and produce emitted light (arrows 514).

The frequency of the lamp current is determined by the VCO circuit, IC1. The frequency of oscillation is largely determined by the timing capacitor 507 and the timing resistor 506. To vary the frequency of oscillation, the voltage at modulation input 5 of IC1 is varied. This is accomplished with resistor divider 504 and 505, which sets the equilibrium voltage at pin 5 of IC1. Incoming data from data port 520 traverses the opto-isolator device 501, modulating the voltage at modulation control input pin 5 through the additional current coupled through resistor 503 and the photo-transistor of opto-isolator 501. High voltage for the lamps is obtained from HV supply 519. Lower voltage for the ICs is obtained from the Vcc supply 518. Additionally higher voltage above the HV-level, for the operation of the upper MOSFET driver, is obtained by a bootstrap method with diode 508 and storage capacitor 509.

It should be understood that other types of VCO-integrated circuits are available for ballast applications. The above description is meant to illustrate a typical example, and should not be construed as being applied to that particular integrated circuit only.

Figure 10:
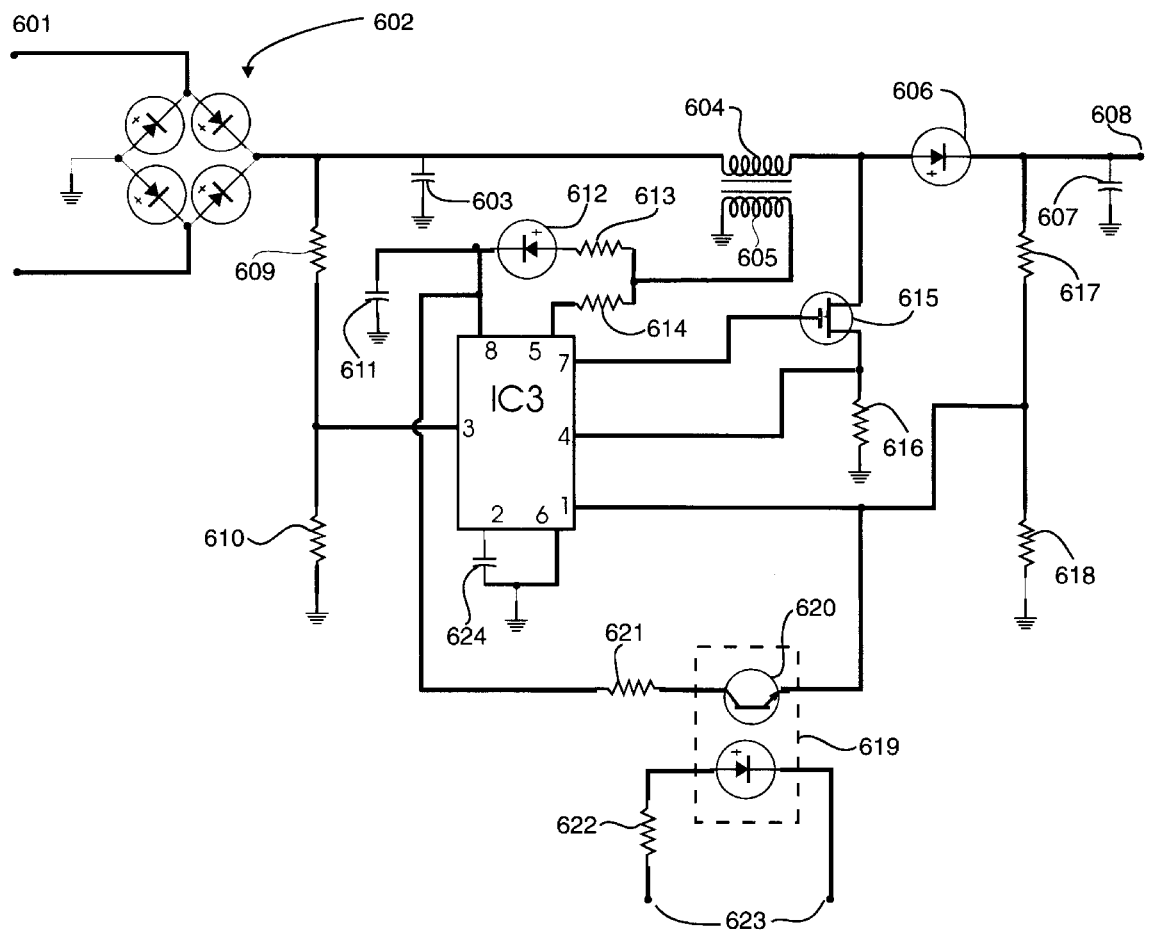
FIG. 10 depicts a circuit diagram of an embodiment of the modified ballast of this invention, using amplitude modulation.

Referring to FIG. 10, an embodiment using amplitude modulation is shown. In this embodiment, a standard, power-factor correction (PFC), integrated circuit IC3 is used to provide a method of varying the DC output voltage 608, which is supplied to an inverter circuit that drives fluorescent lamp tubes. The IC3 in FIG. 3 is a Siemens TDA4862 PFC integrated circuit. Other types of integrated circuits are available, and the following explanation is meant to be descriptive in nature, and not confined to this particular integrated circuit. The integrated circuit provides a control system that supplies gate-drive pulses to MOSFET transistor 615. The low frequency bandwidth of the control system limits this method to the transmission of low data rate digital signals; transmission of audio signals by this means is not practical. The switching action of the MOSFET, in conjunction with inductor 604 and fast-switching diode 606, causes a DC voltage to appear on filter capacitor 607 which is larger than the peak of the AC line waveform. This boosted DC voltage is regulated by a servo loop within IC3. A DC voltage divider, formed by resistors 617 and 618, provides an input to the control amplifier on pin 1 of the chip. Similarly, resistors 609 and 610 form a voltage divider that provides a sample of the AC line waveform to the chip, so that the average current drawn from the supply mains follows the details of the line voltage. Control input at pin 1 can be used to vary the DC output voltage by injecting current from opto-isolator 619. This current flows from the auxiliary voltage supply at pin 8 through resistor 621 and photo-transistor 620. The current flow is controlled by data at data port 623. The circuitry shown in FIG. 6 is the standard circuitry needed to accomplish the power-factor correction function, and should be recognized as such by those skilled in the art.

Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. An electronic ballast for gas discharge lighting which is energized with a periodic waveform, said electronic ballast being coupled to a plurality of gas discharge lamps that provide a gas discharge light output, means for operating upon said gas discharge light output such that at least a portion of said light output from said gas discharge lamps is substantially proportional to an absolute value of an instantaneous waveform of lamp current, photo-detection means for detecting said at least a portion of said light output at a remote distance from said electronic ballast, said ballast containing modulation means for modulating said light output, said ballast containing at least one input port for entry of input signals from an external source into said modulation means, and means for introducing information to said input port so that the discharge light output of the gas discharge lamps can carry the introduced information.

2. The electronic ballast for gas discharge lighting in accordance with claim 1, wherein said modulation means modulates the light output of the discharge lamps with frequency modulation.

3. The electronic ballast for gas discharge lighting in accordance with claim 1, wherein said modulation means modulates the light output of the discharge lamps with phase modulation.

4. The electronic ballast for gas discharge lighting in accordance with claim 1, wherein said modulation means modulates the light output of the discharge lamps with amplitude modulation.

5. The electronic ballast for gas discharge lighting in accordance with claim 1, wherein said modulation means further comprises a self-oscillating, bipolar inverter that is coupled to said plurality of gas discharge lamps, so that at least a portion of the light output from said lamps is substantially proportional to the absolute value of the instantaneous waveform of the lamp current.

6. The electronic ballast for gas discharge lighting in accordance with claim 1, wherein said modulation means further comprises an inverter and a network for generating said light output, said inverter further comprising a base drive circuit that is coupled and phased to said network in order to provide a positive feedback.

7. The electronic ballast for gas discharge lighting in accordance with claim 6, wherein said base drive circuit further comprises transistors, said base drive circuit providing a base drive signal for causing the transistors to operate in a base charge storage region during a principal, on-time interval.

8. The electronic ballast for gas discharge lighting in accordance with claim 7, wherein said transistors comprise a first transistor and a second transistor, and said base drive circuit provides a time interval between said on-time and an off-time, said first transistor changing from an "on" state to an "off" state, while said second transistor changes from an "off" state to an "on" state.

9. The electronic ballast for gas discharge lighting in accordance with claim 8, wherein during said cross-conduction interval, stored minority carriers within an active base region are discharged from said second transistor in an "on" state, and charged into an active base region of said first transistor in an "on" state, causing a transition of the first, conducting transistor from said saturated region through said active region to said cut-off region, thereby causing two delay intervals to occur in an oscillation waveform for each of said first and second transistors.

10. The electronic ballast for gas discharge lighting in accordance with claim 9, wherein said base drive circuit includes a base bias current modulation means, whereby a base current is modulated by at least one of said input signals, so as to vary the base current in accordance with said input signal to affect said stored minority carriers, and to modulate said two delay intervals during said cross-conduction interval.

11. The electronic ballast for gas discharge lighting in accordance with claim 5, wherein said self-oscillating, bipolar inverter further comprises a push-pull circuit.

12. The electronic ballast for gas discharge lighting in accordance with claim 5, wherein said self-oscillating, bipolar inverter further comprises a half-bridge circuit.

13. The electronic ballast for gas discharge lighting in accordance with claim 5, in which a base current is modulated by an audio signal to produce frequency modulation of an optical carrier signal.

14. The electronic ballast for gas discharge lighting in accordance with claim 5 in which a base waveform that is modified to phase-modulate an oscillation of said self-oscillating, bipolar inverter in accordance current is modulated by an audio signal to produce phase modulation of an optical carrier signal.

15. The electronic ballast for gas discharge lighting in accordance with claim 5, in which base current is modulated between discrete binary levels so as to encode data in an oscillation of said self-oscillating, bipolar inverter in a frequency-shift-keyed mode of frequency modulation.

16. The electronic ballast for gas discharge lighting in accordance with claim 15, wherein said base drive circuit comprises a base drive waveform that is modified to phase-modulate an oscillation of said self-oscillating, bipolar inverter and to provide a binary, phase-modulated signal.

17. The electronic ballast for gas discharge lighting in accordance with claim 7, wherein said base drive circuit comprises a base drive waveform that is modulated by a periodic carrier signal, and wherein a frequency or phase of said periodic carrier signal is modulated in accordance with binary data provided by said input port, and further wherein output data is encoded in the frequency or phase of the frequency-modulated, periodic carrier signal.

18. The electronic ballast for gas discharge lighting in accordance with claim 1, wherein said input port comprises a modem device connected to an AC power input line of said electronic ballast.

19. The electronic ballast for gas discharge lighting in accordance with claim 1, wherein said input port is operatively connected to a telephone line connected to said electronic ballast.

20. The electronic ballast for gas discharge lighting in accordance with claim 1, wherein said input port comprises an RF-antenna connected to said electronic ballast.

21. The electronic ballast for gas discharge lighting in accordance with claim 1, wherein said input port is driven by another, adjacent electronic ballast.

22. The electronic ballast for gas discharge lighting in accordance with claim 1, further comprising a receive-port, and an electronic receiving means for receiving signals from remote devices via a receive link, and transmitting means for transmitting received information back to a controlling, host computer.

23. The electronic ballast for gas discharge lighting in accordance with claim 22, wherein said receive link receives information via an optical path.

24. The electronic ballast for gas discharge lighting in accordance with claim 22, wherein said receive link receives information via an RF, wireless path.

25. The electronic ballast for gas discharge lighting in accordance with claim 22, wherein said receive link receives information via an AC power line modem.

26. The electronic ballast for gas discharge lighting in accordance with claim 22, wherein said receive link is directly wired to said electronic ballast.

27. The electronic ballast for gas discharge lighting in accordance with claim 1, wherein said electronic ballast is series-coupled to said plurality of discharge lamps.

28. The electronic ballast for gas discharge lighting in accordance with claim 1, wherein said electronic ballast is coupled in parallel to a plurality of networks, each of said networks comprising a discharge lamp connected in series with a ballast capacitor.

29. An electronic ballast for gas discharge lighting which is energized with a periodic waveform, said electronic ballast being coupled to a plurality of gas discharge lamps that provides a gas discharge light output, means for operating upon said gas discharge light output so that at least a portion of said light output from said gas discharge lamps is substantially proportional to an absolute value of an instantaneous waveform of lamp current, photo-detection means for detecting said at least a portion of said light output at a remote distance from said electronic ballast, said ballast containing modulation means for modulating said light output, said modulation means comprising an inverter and a network for generating said light output, said inverter further comprising a base drive circuit that is coupled and phased to said network in order to provide a positive feedback, said ballast containing at least one input port for entry of input signals from an external source into said modulation means, and means for introducing information to said input port so that the discharge light output of the gas discharge lamps can carry the introduced information.

30. An electronic ballast for gas discharge lighting which is energized with a periodic waveform, said electronic ballast being coupled to a plurality of gas discharge lamps that provides a gas discharge light output, means for operating upon said gas discharge light output so that at least a portion of said light output from said gas discharge lamps is substantially proportional to an absolute value of an instantaneous waveform of lamp current, photo-detection means for detecting said at least a portion of said light output at a remote distance from said electronic ballast, said ballast containing modulation means for modulating said light output, said modulation means further comprising a self-oscillating, bipolar inverter that is coupled to said plurality of gas discharge lamps, a base current of said ballast being modulated between discrete binary levels so as to encode data in an oscillation of said self-oscillating, bipolar inverter in a frequency-shift-keyed mode of frequency modulation, said ballast containing at least one input port for entry of input signals from an external source into said modulation means, whereby information introduced to said input port is carried upon the discharge light output of the gas discharge lamps.

* * * * *